W. BENNETT.
ANTIGLARE DEVICE FOR HEADLIGHTS.
APPLICATION FILED NOV. 28, 1919.
1,344,164.
Patented June 22, 1920.
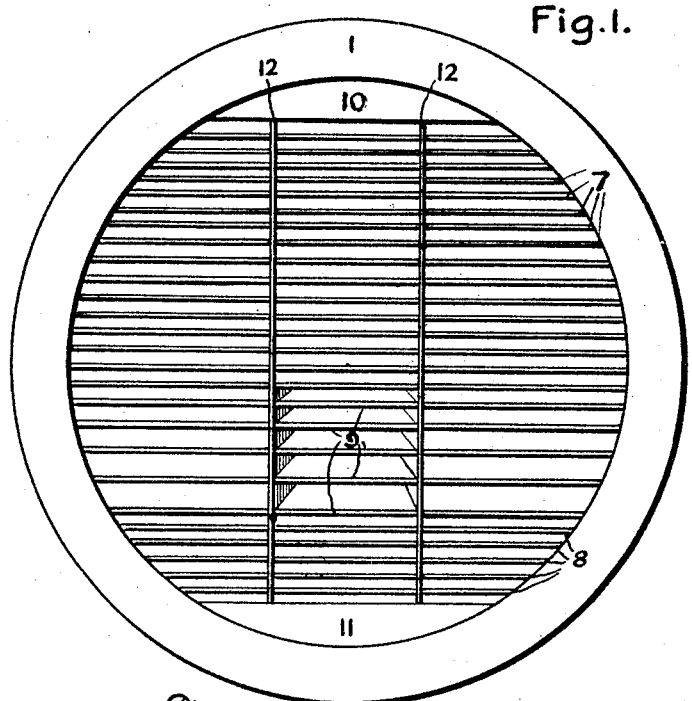
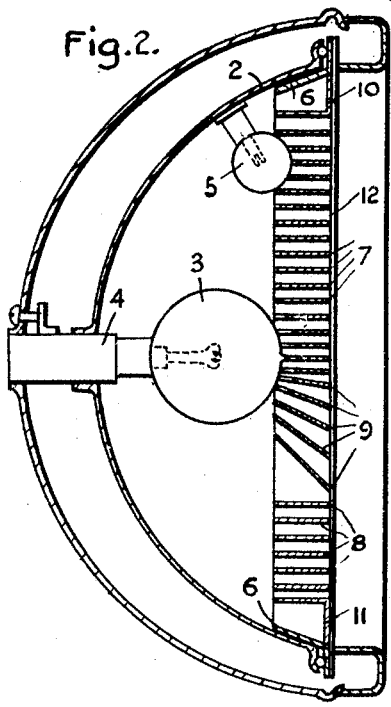
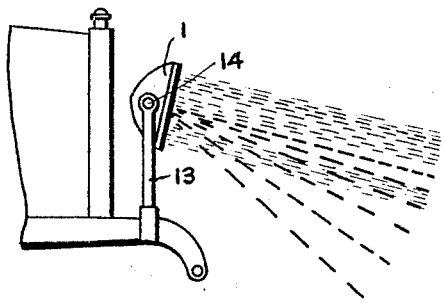
Inventor
WM. BENNETT

UNITED STATES PATENT OFFICE.

WILLIAM BENNETT, OF HAMILTON, ONTARIO, CANADA.

ANTIGLARE DEVICE FOR HEADLIGHTS.

1,344,164.     Specification of Letters Patent.     Patented June 22, 1920.

Application filed November 28, 1919. Serial No. 341,096.

*To all whom it may concern:*

Be it known that I, WILLIAM BENNETT, of the city of Hamilton, in the county of Wentworth, in the Province of Ontario, Dominion of Canada, have invented certain new and useful Improvements in Antiglare Devices for Headlights, of which the following is the specification.

My invention relates to improvements in antiglare devices for headlights and other lights, and the object of the invention is to devise an antiglare device which will give a good light in the foreground, and the requisite light at a sufficient distance in front of the car or other vehicle, without causing the glare that is so apparent with the headlights and spotlights at present in use; a further object is to construct an antiglare device which can be readily applied to headlights and other lights fitted with parabolic reflectors whether of the single or two light type, and whether or not the lights are close up to the front glass of the lamp.

My invention consists of a frame adapted to be inserted within the reflector, upper and lower non-reflectory horizontal strips suitably secured to the frame, intermediate transversely horizontal and longitudinally diverging strips, secured to the frame, said strips being non-reflectory, top and bottom pieces suitably secured to the frame, and vertical non-reflectory reinforcing strips secured to the top and bottom pieces and to the respective strips, all as hereinafter more particularly described, and illustrated in the drawing in which:—

Figure 1 represents a front elevation of an antiglare device constructed according to my invention.

Fig. 2 is a vertical cross section thereof, showing the same applied to a lamp, and Fig. 3 is a side elevation of the front part of a car showing a lamp fitted with my device applied thereto.

Like characters of reference indicate corresponding parts in the different views.

1 is the lamp provided with the parabolic reflector 2. 3 is the headlight bulb mounted in a suitable socket 4. 5 is the subsidiary bulb.

6 is the frame of my antiglare device, which is designed to conform in shape with the reflector 2 within which it is inserted. 7 are the upper horizontal non-reflectory strips, and 8 are the lower horizontal reflectory strips. Both of the series of strips 7 and 8 are secured to the frame 6. 9 are the transversely horizontal and longitudinally diverging intermediate non-reflectory strips also secured to the frame 6.

10 and 11 are respectively the top and bottom pieces which are secured to the frame 6. 12 are the vertical non-reflectory reinforcing strips which are secured at their upper ends to the top piece 10 and at their lower ends to the bottom piece 11, said strips 12 also being secured to the respective strips 7, 8, and 9.

13 is a bracket provided with trunnions 14 by means of which the lamp 1 is attached to the front of the car. It will be noted that the lamp 1 is inclined downwardly a certain extent. Where brackets without trunnions are used for attaching the lamp to the car, such brackets would have to be bent forwardly to give the necessary inclination to the lamp.

In lamps where there is insufficient distance between the reflector and the front glass to take my antiglare device, the rear portions of the strips 7 and 9 are cut away to receive the bulbs 3 and 5.

From the above description it will be seen that in the upper part of the lamp only the rays of light parallel to the strips 7 will be thrown out. In the lower portion of the lamp the only rays thrown out will be those parallel to the strips 8. These rays give the distant light. As the lamp is inclined downwardly a certain extent in the bracket 13 these rays will be projected downwardly and will consequently do away with any glare.

In the intermediate portion of the lamp, only the direct rays of light from the bulb 3 which are parallel to the diverging strips 9 are permitted to be thrown out, and these rays give the requisite foreground light. All other rays are eliminated.

The strips 7, 8, 9 and 12 are either made of non-reflectory material, or are covered or coated with such in order to prevent any reflection of light from their surfaces.

The vertical reinforcing strips 12 are inclined outwardly from rear to front, for the portion of their height which is in engagement with the diverging strips. This is so as to obviate the blocking of the direct rays from the lamp, and such inclination would be parallel with such rays.

What I claim as my invention is:

1. In an antiglare device, the combination with a downwardly inclined lamp and a parabolic reflector therefor, of a plurality of non-reflectory transverse upper and lower strips extending across the reflector, the plane of each being parallel to the longitudinal axis of the lamp, and a plurality of intermediate longitudinally diverging non-reflectory strips located below the focus of the reflector, their forward edges parallel to the aforesaid strips, said strips extending across the reflector.

2. In an antiglare device, the combination with a downwardly inclined lamp and a parabolic reflector therefor, of a frame conforming in shape with the front of the reflector, top and bottom pieces secured to the frame, a plurality of non-reflectory transverse upper and lower strips extending across the frame, the plane of each being parallel to the longitudinal axis of the lamp, and a plurality of intermediate longitudinally diverging non-reflectory strips located below the focus of the reflector and extending across the frame, the forward edges of the longitudinally diverging strips being parallel to the aforesaid strips.

3. In an antiglare device, the combination with a downwardly inclined lamp and a parabolic reflector therefor, of a plurality of non-reflectory transverse upper and lower strips extending across the reflector, the plane of each being parallel to the longitudinal axis of the lamp, a plurality of intermediate longitudinally diverging non-reflectory strips located below the focus of the reflector, their forward edges parallel to the aforesaid strips, said strips extending across the reflector, and a plurality of vertical reinforcing non-reflectory strips secured to the aforesaid strips.

4. In an antiglare device, the combination with a downwardly inclined lamp and a parabolic reflector therefor, of a plurality of non-reflectory transverse upper and lower strips extending across the reflector, the plane of each being parallel to the longitudinal axis of the lamp, a plurality of intermediate longitudinally diverging non-reflectory strips located below the focus of the reflector, their forward edges parallel to the aforesaid strips, said strips extending across the reflector, and a plurality of vertical reinforcing non-reflectory strips secured to the aforesaid strips, said vertical strips inclined outwardly from rear to front, for the portion of their height corresponding with their engagement with the diverging strips.

WILLIAM BENNETT.

Witnesses:
GERTRUDE NICHOLSON,
J. W. G. MITCHELL.